March 28, 1967  C. A. BELSTERLING ETAL  3,310,985
ACCELEROMETER APPARATUS

Filed April 7, 1964  4 Sheets-Sheet 1

INVENTORS:
CHARLES A. BELSTERLING
ROBERT L. COLCORD
BY Howson & Howson
ATTYS.

March 28, 1967    C. A. BELSTERLING ETAL    3,310,985
ACCELEROMETER APPARATUS

Filed April 7, 1964      4 Sheets-Sheet 2

INVENTORS:
CHARLES A. BELSTERLING
ROBERT L. COLCORD
BY Howson & Howson
ATTYS.

March 28, 1967 C. A. BELSTERLING ETAL 3,310,985
ACCELEROMETER APPARATUS
Filed April 7, 1964 4 Sheets-Sheet 3
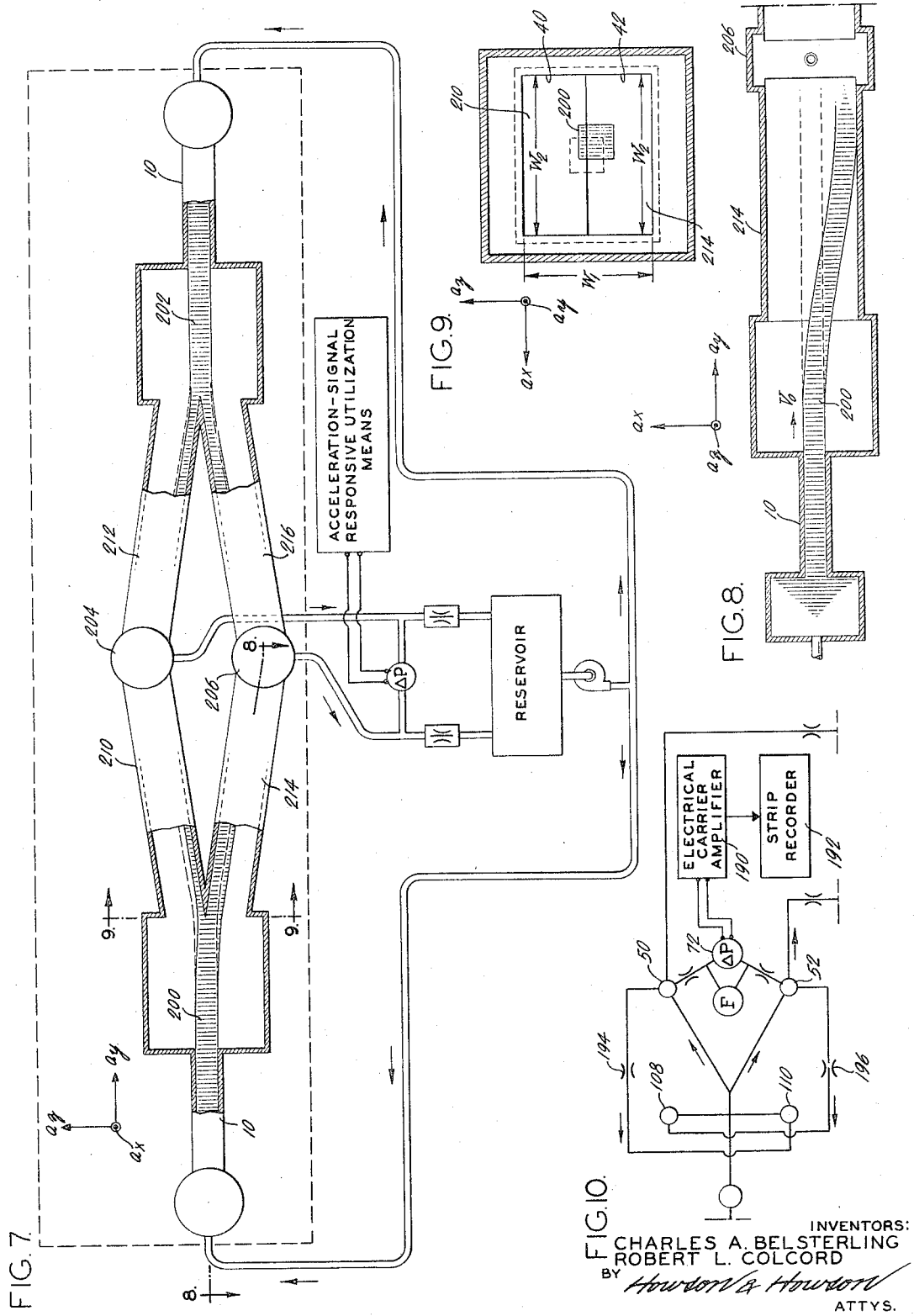
INVENTORS:
CHARLES A. BELSTERLING
ROBERT L. COLCORD
BY Howson & Howson
ATTYS.

March 28, 1967    C. A. BELSTERLING ET AL    3,310,985
ACCELEROMETER APPARATUS
Filed April 7, 1964                                        4 Sheets-Sheet 4
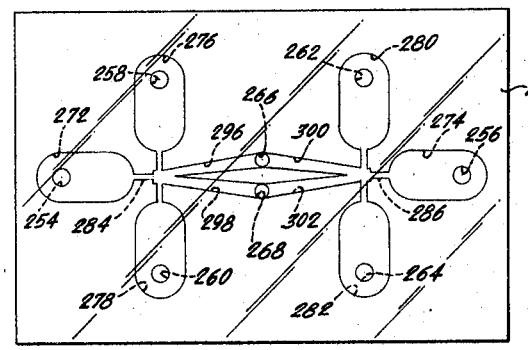
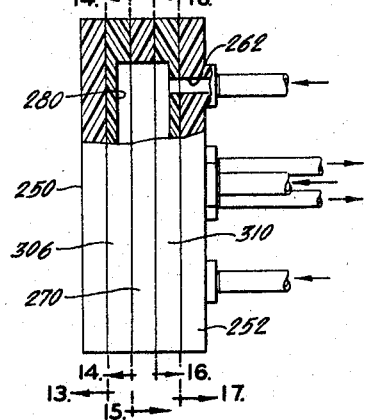
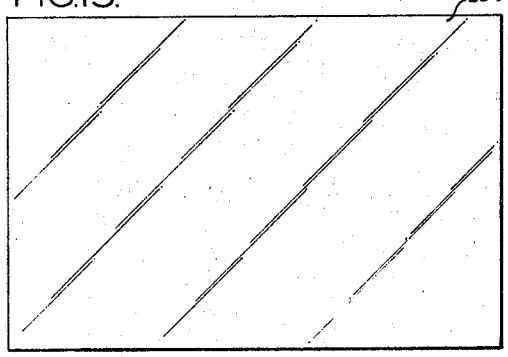
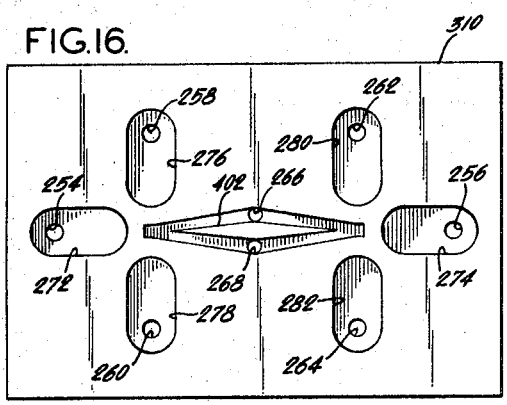
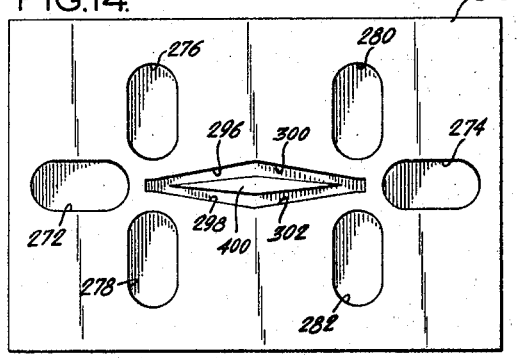
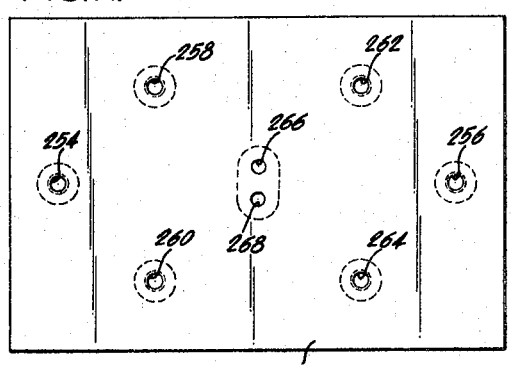
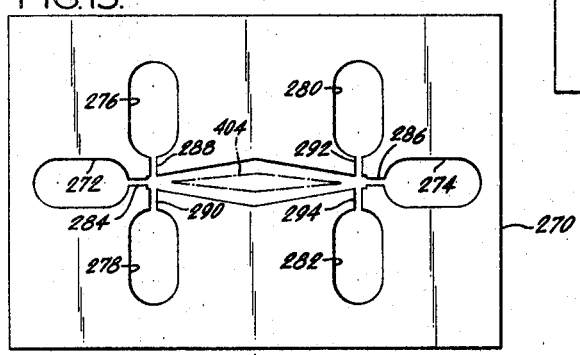
INVENTORS:
CHARLES A. BELSTERLING
ROBERT L. COLCORD
BY Howson & Howson
ATTYS.

United States Patent Office 3,310,985
Patented Mar. 28, 1967

3,310,985
ACCELEROMETER APPARATUS
Charles A. Belsterling, Norristown, Pa., and Robert L. Colcord, Grabill, Ind., assignors to The Franklin Institute, Philadelphia, Pa., a corporation of Pennsylvania
Filed Apr. 7, 1964, Ser. No. 357,951
11 Claims. (Cl. 73—515)

The invention relates to apparatus for producing and utilizing indications of accelerations of a body.

It will be understood hereinafter that, as is common in certain forms of accelerometers, the accelerometer described herein is responsive not only to accelerative forces connected with motional acceleration of the accelerometer but also to accelerative forces produced by certain applied fields, such as gravitational fields, which may act upon the accelerometer even while it is at rest. That is, if the accelerometer is at rest in a gravitational field it will produce an output indicative of the acceleration of gravity, while if it is being motionally accelerated in the gravitational field it will produce an output indicative of the vector sum of the acceleration of gravity and the motional acceleration. Thus the device, when at rest, may be utilized as an instrument for indicating the acceleration of gravity; when subjected to motional acceleration in free space remote from other objects, it may be used as a direct indicator of motional acceleration; and if motionally accelerated in a gravitational field its output signals may be used as indications of either one of the motional acceleration and the gravitational acceleration, when the other is known.

For many purposes it is desirable that an accelerometer be capable of producing output signals indicative of accelerations extending over a range from substantially zero upwards, and in either of two opposite directions. For example, such an accelerometer will be able to produce useful, continuous, acceleration indications even for accelerations of small magnitude, and of either polarity, when the instrument is in free space remote from gravitational fields. These acceleration indications are suitable, for example, for supplying to a computer for space navigation purposes. It is also desirable that the accelerometer have adequate sensitivity so as to provide reliable and accurate indications of small accelerations. In some applications it is also highly desirable for the accelerometer to be of a class making use of variations in the parameters of fluid systems, particularly where fluid amplifiers and related devices are to be employed in connection therewith. In some applications it is also desirable that the accelerometer be primarily sensitive to accelerations along one axis only, or substantially insensitive to acceleration components directed along either or both of two other mutually orthogonal directions at right angles to said axis.

Accordingly it is an object of our invention to provide a new and useful form of accelerometer apparatus.

Another object is to provide a new and useful accelerometer which does not require moving parts subject to frictional wear.

A further object is to provide such apparatus which makes use of fluid flow in deriving the indications of acceleration.

It is a further object to provide such a fluid-type accelerometer apparatus which is sensitive and stable.

Still another object is to provide such fluid-type accelerometer apparatus which produces continuous indications with variation in acceleration over a predetermined range.

It is also an object to provide such apparatus which is operative to provide accurate output indications well below the one-g acceleration of gravity.

A further object is to provide the latter type of accelerometer apparatus in which satisfactory indications of accelerations near zero, and of either polarity, are produced.

A further object is to provide such accelerometer apparatus which produces acceleration indications in response to accelerations directed along a predetermined axis, but discriminates against, and is relatively non-responsive to, acceleration components directed along one or more of two mutually orthogonal directions at right angles to said axis.

In accordance with the invention the above and other objects are achieved as follows. A jet of a fluid such as a liquid or gas is projected or launched toward an apertured barrier so that the jet passes through the aperture in the barrier to an extent depending upon the location of the point at which the center of the cross-section of the jet reaches the barrier. The normal inertial properties of the particles of the jet are such that, in the absence of all accelerations, the jet will form a substantially straight line. The initial velocity of the jet is preferably in such a direction that, when the acceleration is at or near zero, at least some of the fluid of the jet passes through the aperture. In the presence of an accelerative force, which may be due to a gravitational field, for example, or to motional acceleration of the jet-launching means, or both, the jet departs from its straight line form so that the quantity of fluid entering the aperture changes correspondingly. The rate at which fluid passes through the aperture is measured to provide output signals indicative of the acceleration. These output signals may then be applied to appropriate indicating or computing equipment for example, or to any other form of acceleration-indicating-signal utilization means. Preferably a low-pass filter, which may be a pneumatic filter, preceeds the signal utilization means to minimize interfering noise signals.

In a preferred form the apertured-barrier member comprises a pair of apertures separated by a thin partition, and the initial velocity of the jet is in such a direction that, in the absence of acceleration, the jet center impinges the center of the thin partition, equal parts of the fluid jet then flowing through the two apertures. Means for producing pressure variations proportional to the rate of fluid flow through each aperture, and a device for measuring the difference in the latter pressures, are also provided. The difference in pressure indicated by the differential-pressure measuring means then indicates both the magnitude and polarity of acceleration along an axis perpendicular to the initial velocity of the jet and to the partition between the apertures.

We have further found that extraneous variations in the output signal of the accelerometer, commonly designated as "noise," are due in large measure to turbulence of the jet or random scattering of the particles thereof, and that this noise can be reduced substantially, so as to improve the signal to noise ratio of the device, by imposing balanced constraints upon opposite surfaces of the jet. In one form this is accomplished by directing a pair of opposed jets onto opposite surfaces of the jet; in another form, a similar effect is achieved by surrounding the jet with a pressurized chamber containing a fluid medium maintained at a pressure above ambient, thereby to exert an inward, restraining pressure upon all surfaces of the jet.

We have further found that the sensitivity of the acceleration indications increases as the numerical value of the ratio between the mass density of the jet and of the surrounding medium departs further from one, and that a mass-density ratio of at least several times is effective in producing a marked improvement in sensitivity. We have further found that while this difference in densities may be provided by utilizing entirely different materials for the jet and for the surrounding medium, a similar effect can be obtained by utilizing different temperatures and/or pressures of the same substance used for the jet and for the surrounding medium, for example by heating the fluid of the jet or by ejecting the jet under high pressure. In this way, for example, air may be used both for the jet and for the fluid through which the jet is projected.

We have further found that selective responsiveness of the accelerometer to accelerations along a predetermined axis, and discrimination against accelerations along an orthogonal axis, can be accomplished in accordance with one preferred embodiment of the invention by shaping the one or more apertures in the barrier so that they are longer in the direction in which the jet is deflected in response to the undesired acceleration components, and sufficiently longer that the amount of jet fluid entering each aperture stays substantially constant regardless of the deflection in the undesired direction. Effects of acceleration components directed along the direction of the initial velocity of the jet, or opposite thereto, may be compensated for in accordance with another feature of the invention by utilizing a second jet directed oppositely to the original jet, both jets being provided with similar apertured barriers, the fluid from corresponding apertures of the two barriers being supplied to control the pressure in a common port. With this arrangement the change in the pressure in the port produced by one jet, due to longitudinal acceleration, is compensated for by an opposite change produced in the port by the other jet.

These and other objects and features of the invention will be more readily understood from a consideration of the following detailed description, taken in connection with the accompanying drawings, in which:

FIGURE 7 is a schematic representation of a further preferred form of the invention including an arrangement for discriminating against undesired accelerative forces;

FIGURE 8 is a sectional view of the appartus of FIGURE 7, taken along the line 8—8;

FIGURE 9 is a sectional view of the apparatus of FIGURE 7, taken along the line 9—9;

FIGURE 10 is a schematic circuit diagram illustrating one arrangement for using and testing apparatus in accordance with the invention;

FIGURE 11 is a plan view, and FIGURE 12 is a side view partly in section, of a further preferred embodiment of the invention; and FIGURES 13–17 inclusive are separate plan views of different plates which are assembled together to make the apparatus of FIGURE 11.

Figure 1:
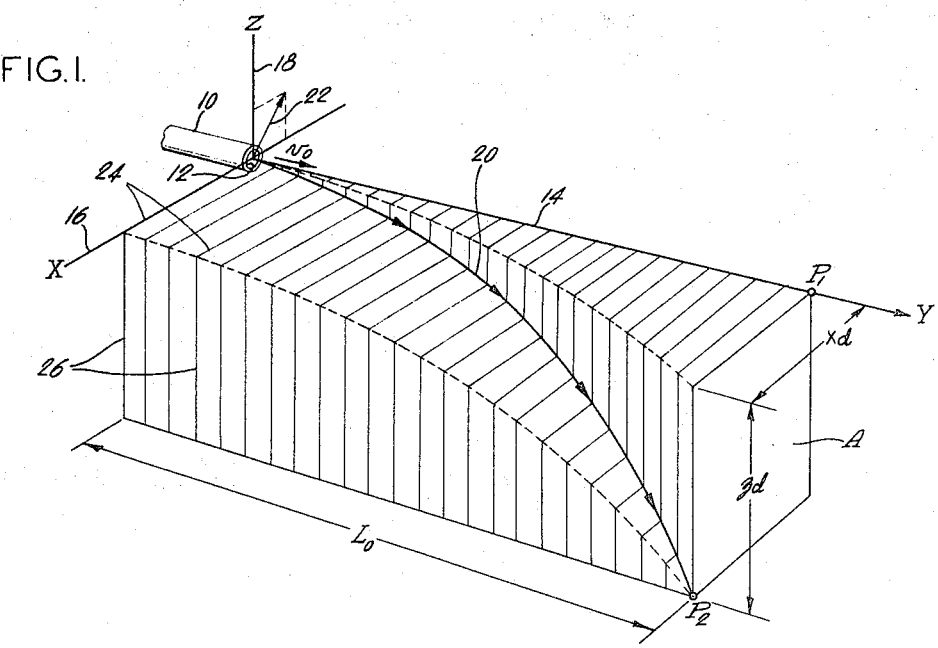
FIGURE 1 is a diagram to which reference will be made in explaining the principle of the invention.

Considering first some of the underlying principles and theory applicable to the invention, FIGURE 1 illustrates a jet-forming means 10 having an orifice 12 for ejecting a defined jet of fluid with an initial velocity $v_0$ along a line 14 designated as the Y axis. Shown also are X and Z axes 16 and 18 respectively, at right angles to each other and to the Y axis, the X, Y and Z axes comprising a usual three-dimensional orthogonal coordinate system having an origin at the center of the orifice 12. The X, Y, Z system of coordinates is understood to be fixed with respect to the jet-forming means 10, so as to move therewith. When jet-forming means 10 is stationary the jet trajectory will be a straight line lying along the Y axis. If the jet-forming means 10 is moving at a uniform velocity the trajectory of the jet will still lie along a straight line 14 coinciding with the Y axis, since each particle of the jet is launched with the same velocity as the velocity of the jet-forming means 10 and will therefore continue to move along in line with the jet-forming means.

However, a relative acceleration between particles of the jet and the jet-forming means 10 will produce a departure from the straight line 14. For example, if the jet-forming means 10 is motionally accelerated upward along the direction of the Z axis, the jet will appear deflected downward to an increasing extent as it travels further from the origin; if the jet-forming means is accelerated directly along the X axis, the jet will be deflected along the X-axis direction; an acceleration along a line in the XZ plane, but not along either the X or Z axes, produces a jet deflection in both the X and Z directions simultaneously, the amounts of deflections in the two directions being proportional to the components of acceleration resolved along these two axes.

Deflection of the jet will occur whether the relative acceleration between the jet-forming means 10 and the particles of the jet is due entirely to motional acceleration of the jet-forming means 10, entirely to a gravity field acting on the jet while the jet-forming means 10 is held in a fixed position, or to a combination of motional and gravitational accelerations. The basic reason for the deflection is that those particles of the jet which have travelled farthest from orifice 12 have been subjected to a relative acceleration with respect to the jet-forming means 10 for a longer period than have later-issuing particles. In the case of a fixed jet-forming means 10 and a gravitational field acting downwardly along the Z axis, the principles determining the jet trajectory are similar to those applicable to a ballistic projectile launched along the Y axis and falling toward the ground; in the case of upward motional acceleration of the accelerometer along the Z axis of the jet-forming means 10 in free space away from all significant fields, the deflection may be considered as due to the fact that each particle of the jet, as it issues from orifice 12, starts from a higher point than did the preceding particle of the jet. The nature of the jet path is substantially the same in the latter two cases, and it is convenient in many cases to analyze and measure the properties of the accelerometer in response to a gravity field alone, with the knowledge that the results are applicable to analogous situations involving motional acceleration of the jet-forming means.

Line 20 of FIGURE 1 represents a typical general trajectory for a jet when the total relative acceleration of the jet-forming means 10 with respect to the jet, including both motional acceleration and the effect of gravitational acceleration, is directed along a vector 22 in the XZ plane at about 45 degrees to both the X and Z axes. Each point in the trajectory line 20 is defined with respect to the center of the orifice 12 by an X coordinate such as is indicated by the length of the lines 24, a Z coordinate such as is represented by the lengths of the lines such as 26, and a Y coordinate such as is represented by the displacement of the point from the XZ plane along the direction of the Y axis. The result of acceleration is to change the point at which the center of the jet strikes a plane A disposed parallel to the XZ plane and at a distance $L_0$ therefrom, from a point $P_1$ on the Y axis to a point $P_2$ having the coordinates $x_d$ and $z_d$ corresponding respectively to the displacement of the impingement point along the X axis and Z axis.

Figure 2:
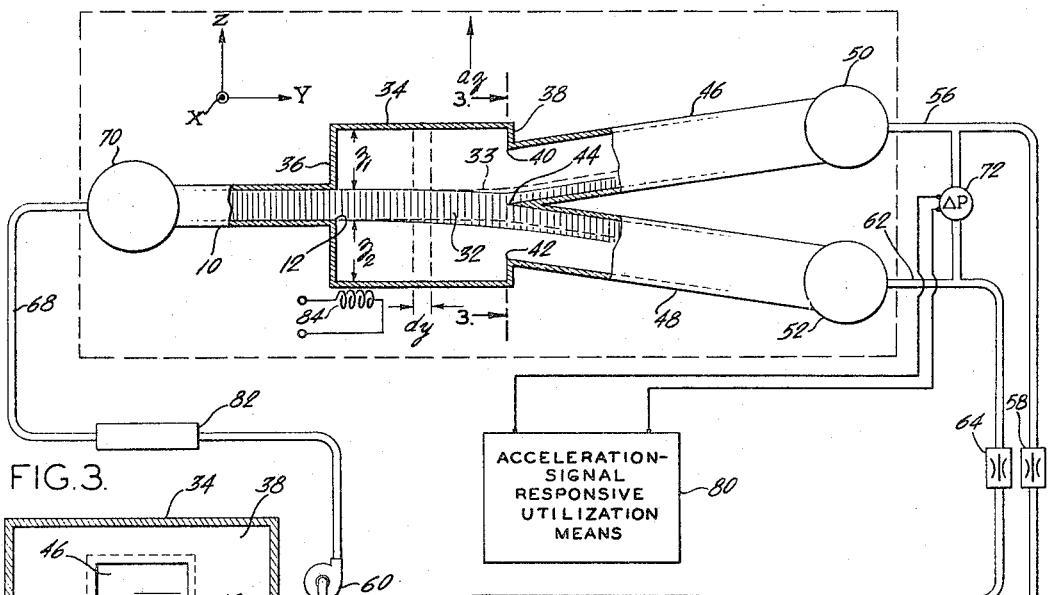
FIGURE 2 is a schematic representation illustrating a basic, simple form of apparatus in accordance with the invention.

FIGURE 2 illustrates schematically one suitable arrangement for launching a jet and for deriving and utilizing acceleration-representing signals in response to deflection of the jet from a straight-line path. It is understood that all of the apparatus shown will normally be mounted on the common supporting structure 31 of the accelerometer. The fluid jet 32 is formed in jet-forming means 10, which may be a tube of square cross-section, and is launched by way of orifice 12 along the direction of the horizontal dashed lines 33. This direction in FIGURE 2 corresponds to the direction of the Y axis, the Z axis being directed upwardly and the X axis into the plane of the paper. In the example shown, an acceleration $a_z$ upward along the Z axis is assumed to be applied to the entire apparatus, which may correspond to an upward motional acceleration of the jet-forming means 10 or a downwardly-directed gravitational force acting on the jet 32 with the jet-forming means 10 at rest, or a combination of both. In response thereto the jet 32 bends downwardly as shown.

Figure 3:
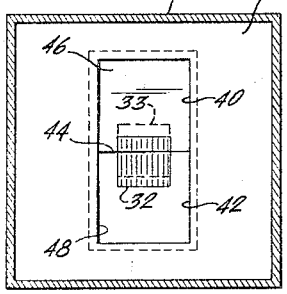
FIGURE 3 is a sectional view of the apparatus of FIGURE 2, taken along the line 3—3.

In this example the jet is assumed to be of a fluid having a density $d_j$, and is projected into a closed chamber 34 containing a fluid medium having a lesser mass density $d_s$. The chamber 34 may be in the form of a box with the jet introduced at the center of one end plate 36 thereof, the other end of the box being closed by an apertured barrier 38. In this example there are provided in barrier 38 the two apertures 40 and 42, which may for example be square in cross-section and disposed one above the other symmetrically about the Y axis along which the jet is initially projected, as illustrated in FIGURE 3. The two apertures are separated by a partition 44 which is very thin at the end impinged by the jet when horizontal, the center of the partion being aligned with the center line of the undeflected jet so as to bisect it. The apertures 40 and 42 communicate respectively with channel members 46 and 48 which lead to outlet ports 50 and 52 respectively. The forward motion of the fluid of the jet carries the jet fluid through the channels 46 and 48 to the ports 50 and 52, the division of the fluid of the jet between the two channels being equal when the jet is undeflected and becoming increasingly greater in the lower channel 48 and smaller in the upper channel 46 when the jet is deflected downwardly, and vice versa when the jet is deflected upwardly by an opposite acceleration.

Fluid reaching port 50 then flows by way of outlet line 56 and fluid restrictor 58 to reservoir 59 and thence to pump 60, while fluid reaching port 52 flows by way of outlet line 62 and fluid restrictor 64 to the same reservoir 59 and pump 60. The fluid resistance provided by the two restrictors is preferably equal. From pump 60 the fluid is forced under the pressure by way of inlet line 68 to the inlet port 70, in which a steady pressure is formed to produce the uniform jet launched by way of orifice 12, as described hereinabove.

A differential-pressure measuring device 72 is connected between the outlet lines 62 and 56, at a point ahead of the corresponding restrictors 64 and 58. The fluid pressures in the outlet lines 56 and 62 depend upon the rate at which fluid of the jet reaches the ports 50 and 52 respectively, being greater when the rate of fluid flow is greater. The output of differential-pressure measuring device 72 therefore indicates the difference in the rates at which fluid enters the two channels 46 and 48 by way of the orifices 40 and 42 respectively. The system connected between the output ports 50 and 52 and the inlet port 70 outside the dashed-line block is arranged in accordance with known practice to be substantially insensitive to the effects of acceleration thereon so far as changing the output signals from transducer 72 are concerned.

Assuming now a jet fluid more dense than the fluid medium in chamber 34, in the absence of acceleration the jet is directed along the Y axis and the division of fluid into the two channels 46 and 48 is equal, the corresponding pressures in lines 56 and 62 are equal, and the output of device 72 is substantially zero. However as the jet is deflected downwardly by acceleration forces so as to flow at a greater rate into the lower channel 48 as shown, and at a lower rate into the upper channel 46, device 72 will produce an output signal of a given polarity which is proportional to the amount of deflection of the jet at least unitl the entire jet enters the lower channel 48. Similarly, for an opposite direction of acceleration tending to deflect the jet upwardly and hence more into channel 46, device 72 will produce an opposite polarity output signal, increasing as the jet is directed further upwardly at least until it is directed entirely into channel 46. The magnitude of the output of differential-pressure measuring device 72 is therefore an indication of the magnitude of the total acceleration along the vertical axis, and the polarity of the output signal therefrom indicates the sense of the total acceleration, i.e. upwardly- or downwardly-directed.

The output of the differential-pressure measuring device 72 may be in mechanical form, hydraulic form, or even electrical form, and is typically supplied to acceleration-signal responsive utilization means 80, which may be an indicating means or a computer or similar device for making use of the output signals representative of the acceleration.

A cooling box 82 and a heating coil 84 may also be provided to cool the fluid passing through inlet line 68 and/or to heat the chamber 34, for purposes described hereinafter.

The foregoing description of the operation of the arrangement of FIGURE 2, particularly with regard to the direction of deflection of the jet in response to accelerations, has assumed that the density of the jet is greater than that of the medium in chamber 34 through which the jet is directed. The following more detailed analysis of operation will indicate the nature of jet deflection for other conditions of the system, will indicate the relationship between the output signal and the acceleration and its mathematical basis, and will further indicate certain principles and factors affecting operation which are taken advantage of in further embodiments of the invention to improve the performance in certain respects and for certain applications.

First there will be considered the relation between jet deflection in the Z direction and the component of acceleration in the Z direction. Considering the trajectory of each particle in the jet on the basis of ballistics theory, $$Z_d = \int\int a'_z(t) dt^2 = \tfrac{1}{2} a'_z t^2 \qquad (1)$$

where $Z_d$ = Z coordinate of displacement of jet particle from the Y axis;
$a'_z$ = total, or actual, acceleration of jet particle relative to the jet-launching means, including effects of any buoyant forces acting thereon;
$t$ = elapsed time measured from time of launching of the particle;
$d$ = differential operator.

Neglecting viscosity and boundary effects, the total particle acceleration $a'_z$ is proportional to the total force $\Sigma F_j$ acting on the particle in the Z direction, including any buoyant force $f_{bj}$ acting thereon due to the medium through which the jet is projected. That is, $$m a'_z = \Sigma F_j = m a_z + f_{bj} \qquad (2)$$

where $a_z$ is the acceleration of the jet particle in the Z-direction in the absence of buoyant forces.

To derive an expression representing this value of $f_{bj}$, the pressure in the medium of density $d_s$ in chamber 34 at a point A adjacent the top thereof is designated as $p_0$; at a point B just above the jet, as $p_1$; at a point C just below the jet, as $p_2$; and at a point D just above the bottom of the chamber, as $p_3$. Designating the distance from the top of the jet to the inside of the top of the chamber, near orifice 12, as $z_1$, and the corresponding distance to the inside of the bottom of the chamber 34 from the bottom of the jet as $z_2$, $$p_1 = p_0 + d_s z_1 a_z$$
$$p_2 = p_1 + d_s L a_z$$
$$p_3 = p_2 + d_s z_2 a_z$$

where the jet is assumed to be square in cross-section, L being the length of one side of the cross-section.

The buoyant force $f_{bj}$ is then given by the following expression:

$$f_{bj} = -\Delta y L(p_2 - p_1) = -d_s \Delta y L^2 a_z \quad (3)$$

where $\Delta y$ represents a small incremental length of the jet. Further $$m a_z = d_j \Delta y L^2 a_z \quad (4)$$

Substituting Equations 3 and 4 into Equation 2 then gives:

$$\Sigma F_j = d_j \Delta y L^2 a_z - d_s \Delta y L^2 a_z = m a'_z \quad (5)$$

From Equation 5, $$a'_z = \frac{d_j \Delta y L^2 a_z - d_s \Delta y L^2 a_z}{d_j \Delta y L^2} = a_z \left(1 - \frac{d_s}{d_j}\right) \quad (6)$$

Referring to the arrangement shown in FIGURE 2, and assuming negligible acceleration in the longitudinal or Y-direction, the time $t_0$ required for a jet particle to traverse the distance $L_0$ across chamber 34 is given by:

$$t_0 = \frac{L_0}{v_0} \quad (7)$$

Substituting Equation 7 for $t$ and Equation 6 for $a'_z$ in Equation 1 then gives the following expression for the deflection $z_d$ of the jet in the Z-direction:

$$z_d = L_0^2 / 2 v_0^2 \left(1 - \frac{d_s}{d_j}\right) a_z \quad (8)$$

From Equation 8 it is noted that the jet deflection is directly proportional to the acceleration $a_z$ to be measured, that the ratio $d_s/d_j$ of the densities of the jet fluid and of the medium through which it is projected should depart substantially from 1 in order to obtain adequate deflection sensitivity, that if the density $d_s$ of the fluid is greater than that of the jet fluid the deflection $z_d$ will be opposite to that normally expected, and that the deflection sensitivity can be adjusted or optimized by changing the ratio of chamber length $L_0$ to initial velocity $v_0$, the greater the ratio $L_0/v_0$ the greater the sensitivity.

As shown in FIGURE 2, the deflection $z_d$ of the jet is sensed and converted to signal form by apparatus for measuring the differential flow into the two output ports 50 and 52. Assuming still a jet of square cross-section, negligible breakup of the jet during its trajectory through the chamber, and a partition 44 thin compared with the jet cross-section, the rate $Q_1$ of fluid flow into upper output port 50 and the rate $Q_2$ of fluid flow into the lower output port 52 are given by the following expressions:

$$Q_1 = v_0 (L^2/2 - z_d L)$$
$$Q_2 = v_0 (L^2/2 + z_d L)$$

The differential flow to the two output ports is therefore given by:

$$Q_2 - Q_1 = 2 v_0 z_d L \quad (9)$$

Substituting the value of $z_d$ from Equation 8 into Equation 9 then gives:

$$Q_2 - Q_1 = \frac{L L_0^2}{v_0^2} \left(1 - \frac{d_s}{d_j}\right) a_z \quad (10)$$

The latter equation shows that the differential flow, and hence the differential pressure measured by device 72, is proportional to the acceleration $a_z$ of which indications are desired, and has a polarity indicative of the sense of that acceleration.

Based on Equation 8 above, the deflection sensitivity of the jet can be estimated for a typical case as follows. Assuming a chamber length $L_0$ of 0.5″, an initial velocity $v_0$ of 20″ per second, and a ratio $d_s/d_j$ of about 1/5, an acceleration value for $a_z$ of 1 g., i.e. 386″ per second$^2$, gives a deflection $z_d$ of about 0.10″, which is readily detectable and accurately measurable by means of the doubly-apertured barrier arrangement shown in FIGURE 2.

In order to obtain the desired relatively large ratio between the densities $d_j$ and $d_s$ of the jet fluid and the fluid of the medium respectively, different fluids having widely different mass densities under the same conditions of temperature and pressure may be utilized. For example, the jet may be of water and the medium in the chamber of air when appropriate precautions are taken to prevent accumulation of water in the chamber. However, the same fluid may be used for the jet and for the medium in the chamber by using differences in temperature and pressure conditions to achieve the desired density ratio. For example, the fluid of the jet may be heated or refrigerated by appropriate means applied around the jet-forming means or elsewhere in the system, the density of the jet being greater when cool than when warm. Thus FIGURE 2 illustrates a cooling box 82 applied around inlet line 68 for this purpose. A high pressure provided by the pump 60 in FIGURE 2 will also cause the jet to become more dense when the fluid is a gas. Similarly, appropriate heating or refrigerating means may be applied to the chamber 34 to affect the fluid medium therein so as to make it more or less dense than the jet fluid, and the chamber may also be pressurized and maintained at a pressure above ambient to render the chamber medium more dense. Heating coil 84 comprises one means of heating the medium in chamber 34, by heating of chamber 34.

Figure 6:
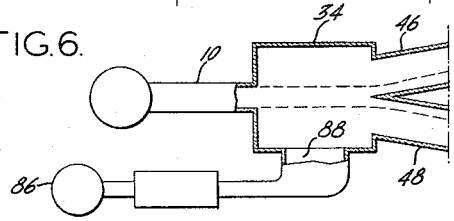
FIGURE 6 is a schematic representation illustrating an alternative form for a portion of the apparatus of the invention.

In order to enable apparatus such as that shown in FIGURE 2 to produce output signals indicative of accelerations near zero it is important to reduce any component in the output signal which tends to obscure the desired acceleration-indicating signals. Such undesired interfering signals are commonly designated as "noise," and one source of such noise is turbulence or instability in the jet flow. Much of this undesired turbulence is generated when the rapidly-moving jet enters the chamber containing relatively static fluid. This effect is somewhat reduced by utilizing a jet fluid of high density. It may also be reduced by providing a flow of the fluid in the chamber which will tend to maintain it at a velocity near the velocity of the jet fluid at the edges of the jet, or by providing in the chamber an elevated static pressure, high compared with the ambient pressure, effectively to pinch the jet by inwardly directed pressure on its periphery. Such an arrangement is illustrated in FIGURE 6, wherein a pump 86 maintains a positive pressure in chamber 34 by way of opening 88. However, we have found it effective and prefer to use for this purpose a flow of fluid directed against directly opposite surfaces of the jet near the point at which the jet is emitted, which effectively serves to pinch the jet due to the momentum of the fluid of the streams used for this noise-quieting purpose.

Figure 4:
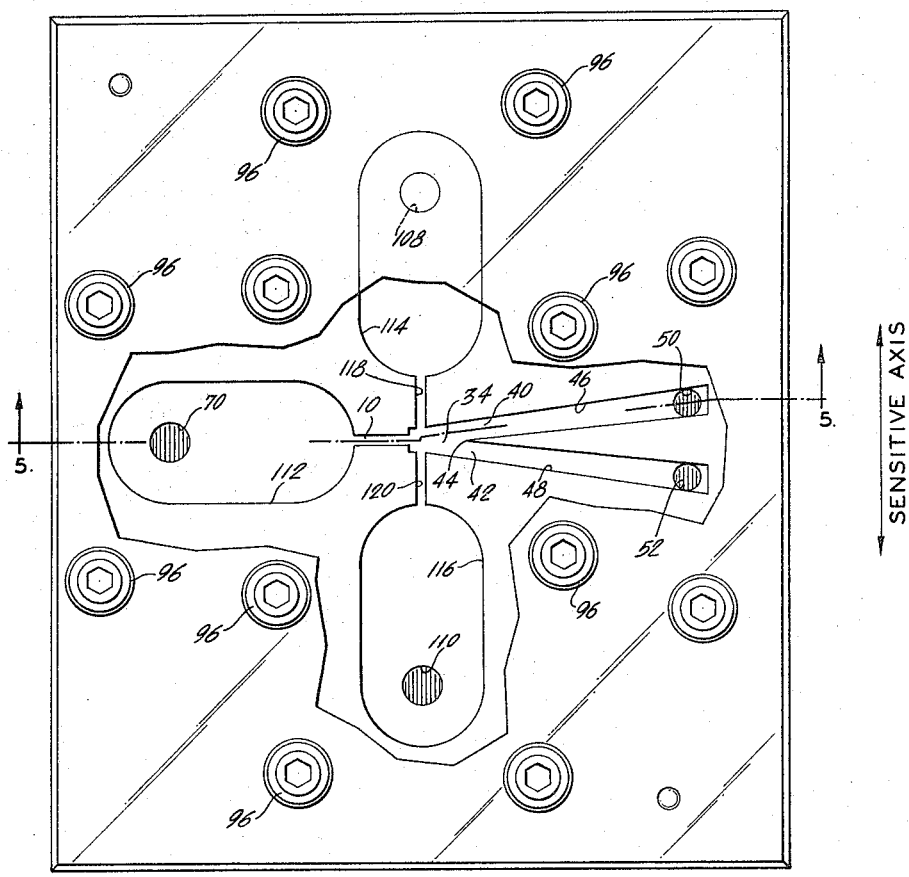
FIGURE 4 is a plan view, partly broken away, of one preferred form of apparatus employed in accordance with the invention.
Figure 5:
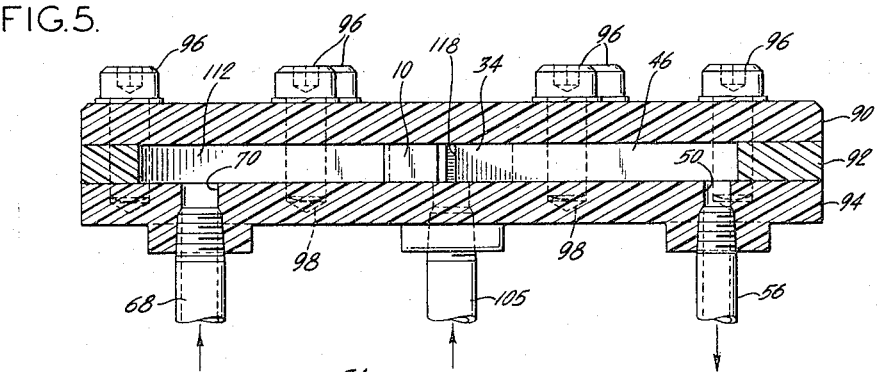
FIGURE 5 is a sectional view of the apparatus of FIGURE 4, taken along the line 5—5.

The latter type of noise-quieting technique is embodied in that specific, preferred form of the apparatus within the dashed block of FIGURE 2 which is represented in detail in FIGURES 4 and 5. Parts of FIGURES 4 and 5 corresponding to parts of FIGURE 2 are indicated by corresponding numerals. As shown the structure may comprise a sandwich of three plates 90, 92 and 94 of plastic or the like having their major surfaces in fluid-sealed contact with each other, as may be provided by means of appropriate screws such as 96 and a sealing cement between the plate surfaces if desired. The top plate 90 has plane-parallel opposed major surfaces, with the exception of apertures provided therein for passage of the screws such as 96. The bottom plate 94 has a plane, continuous upper surface except where threaded recesses such as 98 are provided to receive the screws 96, and except where five communicating cylindrical apertures are provided therethrough from the under surface to the upper surface thereof to provide fluid ports. More particularly, inlet line 68 provides fluid input by way of port 70, a pair of outlet lines such as 56 provide fluid outlet from output ports 50 and 52, and a pair of fluid inlet lines such as 105 provide further fluid inlet by way of side-jet ports 108 and 110 respectively in the lower plate 94. The center plate 92 has a cutout therein extending completely through it between its upper and lower surfaces, which cut-out forms an intercommunicating system comprising the input chamber 112, the jet-forming channel 10, and main-jet chamber 34, the two apertures 40 and 42 separated by the extremely thin partition 44 and communicating respectively with the channels 46 and 48 leading to output ports 50 and 52 respectively, and the side-jet chambers 114 and 116 on opposite sides of chamber 34 and communicating with the chamber 34 by way of side-jet forming means 118 and 120, respectively, which may be similar to main-jet forming means 10.

Fluid under pressure supplied to port 70 by way of inlet line 68 then produces the main jet, which enters chamber 34 generally horizontally in FIGURE 4 and is divided between channels 46 and 48 in a ratio depending on the acceleration $a_z$ along the sensitive Z axis. Fluid similarly under pressure supplied to side-jet ports 108 and 110 produces a pair of side jets directed upon opposite surfaces of the main jet by the jet-forming means 118 and 120 to produce a turbulence-reducing effect on the main jet, thereby reducing the noise in the output signal derived from the output ports 50 and 52, and thus increasing the usable sensitivity of the instrument.

In one specific embodiment of the invention the apparatus shown in FIGURES 4 and 5 was constructed to the scale, and with substantially the same dimensions, as are shown in FIGURES 4 and 5. For test purposes a pressure gauge and a flow gauge may be placed in the inlet supply line 68, and a water manometer and differential-pressure transducer may be connected across the output ports through a pneumatic noise filter having a time constant of approximately 1.5 seconds.

FIGURE 10 illustrates the general test arrangement, wherein F represents the filter and 72 is again the transducer, in this case producing an electrical output. In one example the main jet fluid was laboratory air supplied at a pressure of 4.9" of mercury and flowing at a rate of 3.5 standard cubic feet per minute. The fluid through the chamber 34 was also laboratory air. The side jets were also laboratory air. The electrical output of the differential pressure transducer 72 was connected to a carrier amplifier 190 and a strip-chart recorder 192 in series as shown. The fluid circuit was similar to that shown in FIGURE 2 with the exception that cross-connected feedback restrictors 194 and 196 were provided from output port 50 to side-jet port 110, and from output port 52 to side-jet port 108, as indicated. The transducer-recorder system was calibrated against the water manometer in conventional manner. During this calibration the accelerometer was held fixed with its principal plane surfaces horizontal. After calibration the accelerometer was turned first on one side, so that its sensitive axis was vertical, and the output of the transducer recorded as the response to $-1\ g$. The accelerometer was then turned on its opposite side, with its sensitive axis vertical, and the response recorded for $+1\ g$. The change in recorded output produced by a difference of 2 g in acceleration between the two opposite orientations of the accelerometer produced an indication substantially equal to that provided by 10.5 centimeters of water in the water manometer, corresponding to a sensitivity of about 2.6 centimeters of water per g, and the interfering noise variations were sufficiently small that accelerations of the order of a small fraction of a g were easily observable and detectable.

FIGURE 7 illustrates an arrangement which produces compensation for the effect of longitudinal acceleration components, directed along the Y axis at right angle to the intended sensitive direction of the accelerometer. It will be understood that in many applications the accelerometer will be subjected to accelerations which are not directed entirely along the intended sensitive axis, and yet it may be desired that the accelerometer respond only, or primarily, to the component of acceleration which are directed along its sensitive axis. For example, in missile guidance it is often desirable to provide separate indications of the acceleration components along the X, Y and Z axes, so that these indications can be separately supplied to an appropriate computer. In such a case it is desirable to make the accelerometer insensitive to acceleration components along either of the two axes at right angles to the intended sensitive axis.

The nature and extent of the effect on output indications of acceleration components along the Y axis parallel to the initial velocity of the jet will be appreciated from the following analysis thereof. In this case the jet velocity $v_j$ is not constant in the Y direction throughout its trajectory, but instead $v_j = v_0 - a_y t$, where $t$ is measured from the time a jet particle is emitted. Accordingly $L_0$ no longer equals $v_0 t_0$ but instead:

$$L_0 = v_0 t_0 - \tfrac{1}{2} a_y t_0^2 \qquad (11)$$

the negative sign indicating the fact that acceleration in the direction of the jet reduces the velocity of the jet with respect to its source.

Solving Equation 11 for $t_0$ gives:

$$t_0 = \frac{v_0 - \sqrt{v_0^2 - 2 a_y L_0}}{a_y} \qquad (12)$$

Squaring the latter expression, and expanding in a Taylor series while assuming $v_0^2 > 2 L_0 a_y$, gives to a close approximation:

$$t_0^2 = \frac{L_0^2}{v_0^2} + \frac{L_0^3}{v_0^4} a_y + \frac{5}{4} \frac{L_0^4}{v_0^6} a_y^2 + \frac{7}{4} \frac{L_0^5}{v_0^8} a_y^3 \qquad (13)$$

Substituting this expression for $t_0^2$ into Equation 8 gives:

$$z_d = \frac{1}{2} \frac{L_0^2}{v_0^2} \left[ 1 + \frac{L_0}{v_0^2} a_y + \frac{5}{4} \frac{L_0^2}{v_0^4} a_y^2 + \frac{7}{4} \frac{L_0^3}{v_0^6} a_y^3 \right] \left(1 - \frac{d_s}{d_j}\right) a_z \qquad (14)$$

The expression in brackets in Equation 14 constitutes the factor arising due to acceleration along the jet, and indicates that this factor may be substantial.

This effect of acceleration components along the jet can be minimized by the arrangement shown in FIGURE 7, in which two jets 200 and 202 are directed in opposite directions along the Y axis, each jet and its associated apparatus being like that of FIGURE 2 with the exception that the two jets are launched in opposite directions and common output ports 204 and 206 are used, 204 being supplied with fluid from the two upper channels 210 and 212, and 206 from the two lower channels 214 and 216. Operating conditions for the two jet systems are preferably made the same, and side-jets are preferably employed for noise quieting.

With the arrangement shown in FIGURE 7, any acceleration component directed along the Y axis will be oppositely directed with respect to the directions of the two jets and hence will affect them oppositely. That is, a Y component of acceleration of the accelerometer directed toward the right will increase the jet fluid flow into output port 206 from jet 200 but decrease it as to fluid from the other jet 202 because of the above-mentioned opposite directions of the Y-directed acceleration with respect to the directions of the two opposed jets. The same action occurs with respect to the flow of fluid into the upper port 204. The result is a strong discrimination against acceleration components along the Y axis in the output signal of the accelerometer.

FIGURE 8 illustrates schematically an arrangement by which an accelerometer such as those shown in FIGURES 2 and 7, for example, may be made insensitive to acceleration components directed along the X axis. In FIGURE 8 the jet-forming means 10 is shown again as projecting a jet horizontally with an initial velocity $v_0$ along the Y axis, but in this case the view represents schematically a top view of the accelerometer, so that upward or downward deflection of the jet in FIGURE 8 is due to acceleration components in the X direction, rather than in the Z direction. As represented in FIGURES 9, the length $w_2$ of each of the apertures 40 and 42 in the X direction is large compared with the width $w_1$ of these apertures in the Z direction. As a result an acceleration in the X direction having a magnitude as great as, or even greater than, the maximum Z-axis-directed acceleration to which the instrument is sensitive will not change the output indications of the accelerometer, since the jet still passes entirely through the apertures without curtailment by displacement along the X axis.

FIGURES 11 and 12 illustrate a preferred embodiment of the invention in which discrimination against both X- and Y-directed acceleration components is provided. The device in this instance is made up of five plates which may be of transparent plastic material, in place of the three plates described with reference to FIGURES 3 and 4, the plates being fastened together by a fluid-tight seal in the form of appropriate plastic cement. It also includes the provision of a pair of cross-directed noise-quieting side-jets for each of the oppositely-directed main jets.

As illustrated in FIGURES 11 through 17, the top plate 250 may be plane on both of its opposite major faces, while the bottom plate 252 is plane except for the provision of apertures for the six fluid inputs 254, 256, 258, 260, 262 and 264 for supplying the two main jets and the four side jets, together with similar apertures 266, and 268 for providing fluid outlets from the two outlet ports. The central plate 270 has a cutout completely through it corresponding to two main-jet inlet ports 272 and 274, a first pair of side-jet ports 276 and 278 for the left-hand jet, a similar pair of side-jet ports 280 and 282 for the right-hand jet, the two main-jet forming means 284 and 286, the four side-jet forming means 288, 290, 292 and 294 and the region 296 occupied by the two channel members and the separating material between these two channels. The second plate 306 contains cutouts extending partly, but not entirely, through the thickness of the plate in the regions shown corresponding to the six inlet ports 272, 274 and 276–282, and corresponding also to the four channel members 296–302. The fourth plate 310 is like plate 306 except that it also includes apertures all the way through the plate in alignment with the inlet and outlet apertures of plate 252. Plates 306 and 310 of FIGURES 14 and 16 respectively are positioned in the stack of plates comprising the final assembly as indicated in FIGURE 12, so that the dimensions of the cutout in plate 270 of FIGURE 15 are effectively extended in the X direction by the sum of the depths of the partial cutouts in the two plates 306 and 310. This not only provides a more practical form for the inlet and outlet ports than is provided by the thickness of a single plate, but also serves to provide apertures having a dimension in the X direction several times greater than in the Y direction, thereby to provide the above-described discrimination against components of acceleration in the X direction.

In addition plates 306 and 310 are provided with raised rhomboid regions 400 and 402 respectively, aligned between the two channel pairs of channel members, which rhomboid regions abut and are sealed together when the plates are assembled to provide the necessary separation for the channel members in the region 404 of FIGURE 15.

While the invention has been described with particular reference to specific embodiments thereof in the interests of complete definiteness, it will be understood that it may be embodied in any of a large variety of forms without departing from the scope and spirit of the invention as defined by the appended claims.

We claim:

1. Accelerometer apparatus comprising: a fluid medium; jet-launching means for ejecting a main jet of fluid under pressure into and through said medium, said fluid of said jet having a mass density differing substantially from that of said fluid medium, said jet having a substantially straight-line, undeflected form in the absence of relative acceleration between said jet-launching means and particles of said jet but departing progressively farther from said straight-line form in response to increases in components of said relative acceleration transverse to said jet; apertured barrier means in the path of said jet and defining an aperture positioned to pass a progressively changing fraction of the cross-section of said jet as said departure of said jet from said straight-line form changes in response to said relative acceleration components; means responsive to said jet to produce output signals representative of the magnitude of said fraction of said cross-section of said jet by said aperture; acceleration-signal utilization means having acceleration-signal input means and operable in response to signals indicative of said relative acceleration applied to said input means; means for supplying said output signals to said input means to operate said utilization means; and means for applying a pressure substantially greater than ambient pressure to opposite sides of said jet at least in the initial portion of said trajectory thereof.

2. Apparatus in accordance with claim 1, in which said apertured barrier defines a pair of apertures spaced from each other by a thin partition, and in which said jet is bisected by said partition when undeflected.

3. Apparatus in accordance with claim 2, comprising a first port and a first channel member for conducting fluid of said jet passing through a first of said apertures to said first port, a second port and a second channel member for conducting fluids of said jet passing through a second of said apertures to said second port, and means for measuring the difference between the pressures in said first and second ports.

4. Apparatus in accordance with claim 1, in which said last-named means comprises a chamber enclosing said fluid medium and means for maintaining a positive pressure greater than ambient pressure in said medium.

5. Apparatus in accordance with claim 1, in which said last-named means comprises a pair of fluid jets directed against opposite sides of said main jet.

6. Apparatus in accordance with claim 5, in which said pair of fluid jets exert equal but opposite forces on said main jet.

7. Apparatus in accordance with claim 1, in which the ratio $L_0/v_0$ is sufficiently large to permit deflection of the point of impingement of said main jet on said barrier means by a substantial, detectable, fraction of the diameter of said jet in response to accelerations of $1g$, where $L_0$ is the distance from said jet-launching means to said barrier means and $v_0$ is the initial velocity of said jet toward said barrier means.

8. Apparatus in accordance with claim 1, in which said aperture is substantially greater in a first transverse dimension than in a dimension normal to said first transverse dimension.

9. Apparatus in accordance with claim 1, in which said barrier means defines a pair of apertures separated by a narrow partition, in which said main jet is directed against said barrier so as to be bisected by said partition when undeflected, and in which the spacing, normal to said partition, between either side of said undeflected jet and the aperture edge nearest thereto is less than the spacing parallel to said partition between either side of said main jet and the aperture edge nearest thereto.

10. Apparatus in accordance with claim 1, comprising second jet-launching means for ejecting a second jet of fluid in a direction opposite to said main jet, second apertured barrier means defining an aperture impinged by said second jet so that the fraction of said second jet passing through said last-named aperture varies in accordance with deflection of said second jet from a straight-line path, and a common port for receiving fluid of said main jet and of said second jet which passes through said apertures in said first and second barrier means to develop pressure in said common port varying substantially in proportion to the total rate of flow of fluid of said first jet and said main jet through said apertures in said first and second barrier means, thereby to compensate for acceleration components along the axis parallel to which said main jet and said second jet are ejected.

11. Apparatus in accordance with claim 1, in which said last-named means comprises a pair of fluid jets directed against opposite sides of said main jet in the initial portion of said trajectory thereof, said apparatus also comprising feedback means responsive to variations in the rate of flow of said main jet through said aperture for varying the rate of flow of one of said pair of fluid jets.

References Cited by the Examiner
UNITED STATES PATENTS

| | | |
|---|---|---|
| 1,841,607 | 1/1932 | Kollsman. |
| 2,457,620 | 12/1948 | Abraham _____ 73—517 X |
| 2,959,057 | 11/1960 | Winker _____ 73—516 |
| 3,163,048 | 12/1964 | Siegmund et al. _____ 73—516 |
| 3,205,715 | 9/1965 | Meek _____ 73—516 |

FOREIGN PATENTS

| | | |
|---|---|---|
| 116,375 | 6/1918 | Great Britain. |
| 331,878 | 1/1921 | Germany. |
| 158,630 | 4/1957 | Sweden. |

RICHARD C. QUEISSER, *Primary Examiner.*

J. J. GILL, *Assistant Examiner.*